United States Patent [19]

Olbrich

[11] Patent Number: 4,910,620
[45] Date of Patent: Mar. 20, 1990

[54] THERMAL COMPENSATION STRUCTURE FOR A DISK PACK MODULE

[75] Inventor: Otto Olbrich, Taufkirchen, Fed. Rep. of Germany

[73] Assignee: Siemens Aktiengesellschaft, Berlin and Munich, Fed. Rep. of Germany

[21] Appl. No.: 187,333

[22] Filed: Apr. 28, 1988

[30] Foreign Application Priority Data

May 14, 1987 [DE] Fed. Rep. of Germany ....... 3716179

[51] Int. Cl.⁴ ............................................. G11B 5/012
[52] U.S. Cl. .............................. 360/98.08; 360/99.12; 360/133
[58] Field of Search ................... 360/133, 98.01, 98.08, 360/98.02, 99.12

[56] References Cited

U.S. PATENT DOCUMENTS

| | | | |
|---|---|---|---|
| 3,176,281 | 3/1965 | Pattison | 360/133 |
| 4,519,010 | 5/1985 | Elsaesser et al. | 360/97 |
| 4,672,488 | 6/1987 | Wright | 360/98.08 |
| 4,683,505 | 7/1987 | Schmidt et al. | 360/98.08 |
| 4,692,827 | 9/1987 | Biermeier et al. | 360/97 |
| 4,703,374 | 10/1987 | Biermeier et al. | 360/98 |
| 4,714,972 | 12/1987 | Biermeier et al. | 360/97 |
| 4,739,425 | 4/1988 | Dierkes et al. | 360/97 |

FOREIGN PATENT DOCUMENTS

| | | |
|---|---|---|
| 0169352 | 1/1986 | European Pat. Off. |
| 60-242552 | 2/1985 | Japan. |
| 61-148667 | 7/1986 | Japan. |
| 2158633 | 5/1985 | United Kingdom. |

OTHER PUBLICATIONS

T. J. Rajac, "Method for Improving Dimensional Stability of Disk Stacks", IBM TDB, Aug. 1982, vol. 25, No. 3A, pp. 1097–1098.
"Bistable Disk Clamp to Apply Axial Fouce", IBM TDB, Mar. 1987, vol. 29, No. 10, pp. 4346–4347.
"Disk Pack Clamping Ring", IBM TDB, Apr. 1986, vol. 28, No. 11, pp. 4957–4958.

Primary Examiner—Stuart N. Hecker
Assistant Examiner—David J. Severin
Attorney, Agent, or Firm—Hill, Van Santen, Steadman & Simpson

[57] ABSTRACT

A disk pack module of a manetic disk memory provides a plurality of data disks separated from one another by spacer rings and arranged on a hub that is rotatably arranged in a housing. The data disks are slipped onto the hub against a flange thereof that projects in the radial direction and is constructed to be elastically deformable and are non-positively clamped thereto with a tension plate. A tension plate is provided, as a receptacle for the tension plate, that is fixed at the end face of the hub facing away from the flange and is constructed such that it reversibly deforms given material stresses occurring as a consequence of temperature changes. As a result of a twisting deformation of the tension ring, different thermal expansions of the hub or, respectively, of the element slipped thereon, are intercepted and neutralized in collaboration with the deformation of the hub flange.

11 Claims, 3 Drawing Sheets

THERMAL COMPENSATION STRUCTURE FOR A DISK PACK MODULE

BACKGROUND OF THE INVENTION

1. Field of the Invention

The present invention relates to a disk pack module of a magnetic disk memory in which data disks, separated from one another by spacer rings, are slipped onto a hub which is rotatably arranged in a housing, the disks being located against a hub flange which projects in the radial direction and being clamped thereto in a non-positive manner by way of tension plate.

2. Description of the Prior Art

The technical development of magnetic disk memories, whether hard disk memories or moving head disk memories, as peripheral storage modules in modern data processing systems is continuously accompanied by the foremost desire to increase the storage capacity of such bulk memories. Efforts are therefore exerted, first of all, in order to achieve an optimally high track and bit density per disk surface; on the other hand, nothing is spared in order to accommodate an optimally-great plurality of data disks, given a prescribed mounting space of the magnetic disk memory. Both alternatives of enlarging the storage capacity of such peripheral modules, however, make certain, necessary requirements of the structural format of a magnetic disk memory.

The European patent applications 0 151 260, 0 151 259, 0 151 258 and 0 151 256, disclose pertinent solutions for the structural format of magnetic disk memories in which an internal motor concept is realized. A drive motor is thereby indicated in a receptacle device for the data disks that form a disk stack module together with the motor. A plurality of data disks can be accommodated in a housing with dense packing in this manner. All data disks are simultaneously placed in rotation with the common drive.

The fact that such a drive, integrated into the receptacle device, and referred to as an internal motor, generates stray magnetic fields and not without problems for the storage of the data on the disk. It is consequently critical for a faultless operation in this case that the data disks be magnetically decoupled from the receptacle device constructed as a hub. To this end, the data disks are manufactured of aluminum and the hub is manufactured of soft iron.

One disadvantage of this known solution, however, is a certain temperature sensitivity. Due to temperature fluctuations occurring during transport, but also occurring during operation of a magnetic disk memory, material stresses occur due to the coefficients of thermal expansion of aluminum and iron that differ by about the factor two. It cannot be guaranteed that these material stresses will not assume an order of magnitude that ultimately results in a slipping of the data disks.

The Coulomb coefficient of friction is lent considerable significance in this slipping. Since the coefficients of friction expand greatly, slipping only occurs coaxially relative to the rotational axis of the data disks in exceptional cases. Based on manufacture, the data disks often exhibit a certain eccentricity that can still be tolerated. A further eccentricity produced by the scatter of the Coulomb efficients of friction is added thereto as a consequence of the temperature-dependent material stresses. This eccentricity of the data disks that is again highly likely to vary over the course of the operating time lies on an order of magnitude that can lead to errors when reading the data stored on the disk given magnetic disk memories having high track density.

When the eccentricity of the data disks reaches an order of magnitude of 10 $\mu$m as a consequence of temperature fluctuations under the described operating conditions, given track densities that are currently standard, even a servo control for the tracking of the read heads that is standard in current high-capacity disk memories can no longer track with adequate precision.

The drive motor in another group of traditional magnetic disk memories is constructed as an external motor, i.e. the data disks are driven by a motor that is externally flanged to the housing of the magnetic disk memory. In this structure of a magnetic disk memory, both the hub and the data disks can be manufactured of aluminum. The advantages, first of all, of not having to additionally shield the stray magnetic fields of the motor and, secondly, of not having to consider the occurrence of any temperature-dependent material stresses are opposed by the disadvantage of a lower storage capacity given a prescribed mounting space for the disk memory.

U.S. Pat. No. 4,519,010, fully incorporated herein by this reference, further discloses a magnetic disk memory comprising an internal motor in which the hub and the data disks are likewise manufactured of identical material. As a result of the identical coefficients of thermal expansion, no thermal material stresses thereby arise in such a structure at the seeping surfaces of the data disks on the hub. However, a magnetic shield for the stray magnetic fields deriving from the internal motor is required in this case so that the data disks are magnetically decoupled. One part of the shield is composed of a magnetic reflux or return ring of magnetically-conductive material, preferably soft iron, that surrounds the permanent magnet of the drive motor. The entire internal motor is ultimately magnetically shielded from the data disks by further protective rings. An unreasonably-high structural expense and high space requirement in order to assure the magnetic shielding of the data disks are disadvantageous in this solution.

Alternatively thereto, the German application 35 15 059, fully incorporated herein by this reference, and corresponding to the British patent specification 21 58 633, discloses a possibility of compensating the mechanical and thermal stressing during transport and during operation of the disk memory that occurs in the internal motor design. The relative disk location of the data disk manufactured of aluminum relative to an iron hub should thereby be avoided by the integration of a clamp device that is flexibly designed in order to achieve constant friction conditions. A cup-shaped clamp, constructed slightly resilient, is provided and is connected to the iron hub with a threaded bolt and mechanically clamps the data disk. What is thereby suppose to be achieved is that the Coulomb friction in the critical seating region between the hub and the data disk is greater than between the data disk and the clamp. The clamp device should therefore yield given the occurrence of mechanical and thermal stresses without a radial dislocation occurring for the data disk. Opposing this described solution, however, is that the required constancy in the friction condition is not assured without further measures given frequent temperature changes. Added thereto is that the structural requirements made of a magnetic disk memory of the type set forth are only unsatisfactorily resolved by such a clamp device.

SUMMARY OF THE INVENTION

It is therefor an object of the present invention to provide a disk pack module of the type set forth above in which the seating of the data disk at a hub rotatably seated in a disk memory housing are radially designed such that they elastically deform due to micro movements given temperature changes. The stiffness of the seats is thereby to be adapted such that the axial elastic force is still adequate in order to reliably avoid a slipping of the individual data disks, even given maximum temperature swings.

The above object is achieved, in a disk pack module of the type set forth above and further constructed in accordance with the invention, such that the arrangement is particularly characterized in that the flange of the hub is constructed to be elastically deformable, and in that a reversibly deformable tension ring, as a receptacle for the tension plate, is fixed on that surface of the hub facing away from the flange.

The above structure is particularly characterized in that a clamp device for fixing the data disk to a hub is replaced by a receptacle device that effects a neutralization of extension for compensating temperature response. To this end, this receptacle device encompasses the flange that is radially salient at the hub, the tension ring, the tension plate and the annular disk. Together with the data disks and spacer rings arranged therebetween, this latter annular disk is slipped onto the hub and then lies against the flange. The disk pack is chucked in a non-positive manner with the tension ring and the tension plate. The receptacle device fixes the data disk in both the axial direction and in the radial directions, not only in their assembled condition, but also compensates the forces produced by micro movements given temperature changes in the operating condition since the tension ring and the flange elastically deform, i.e., reversibly deformed. In the assembled condition, furthermore, the receptacle device guarantees only a slight bending of the elastically-constructed flange as a consequence of the axial, frictional connection directly above the generated line of the hub. The bias force thereby attacking the overall flange is guided such, with respect to an annular disk, that an optimally high surface pressure against the flange occurs.

The forces in the axial direction, and also in the radial direction, produced as a consequence of the thermal material stresses can therefore be compensated. The present invention also assures that, first of all, the stray magnetic fields of the drive motor do not negatively influence the data disks and that, secondly, a constantly-changing eccentricity of the data disk during disk memory operation is avoided. Contrasting with the known, proposed solution, this permits a simple magnetic shielding, whereby the present invention means that no losses of storage capacity must be accepted given a prescribed mounting space for the magnetic disk memory.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
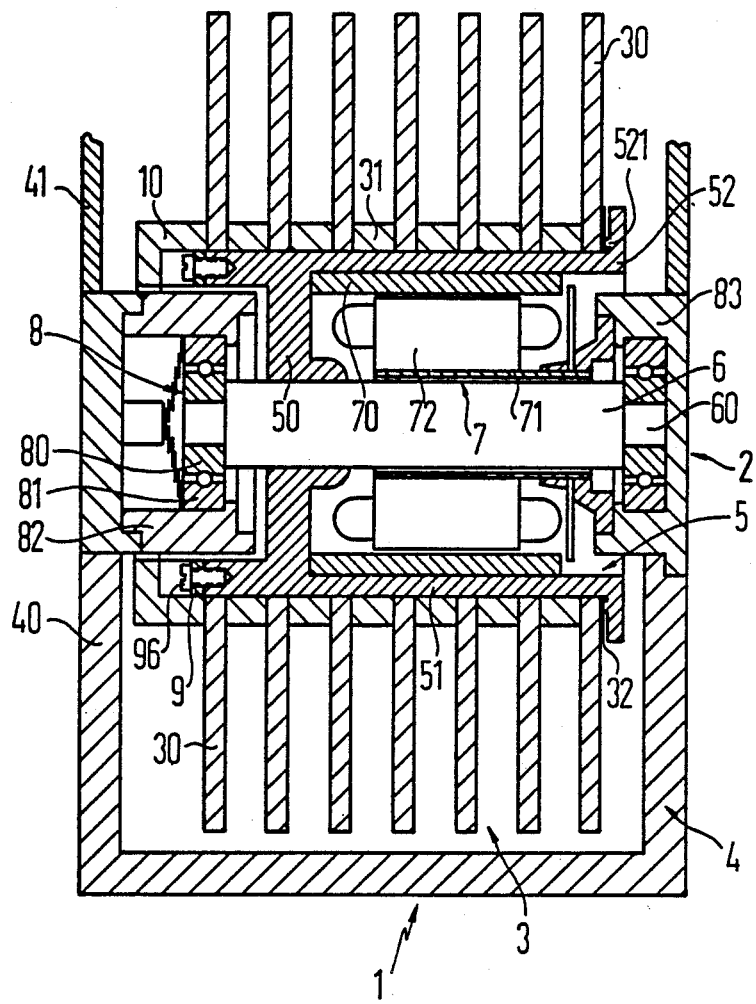
FIG. 1 is a sectional view through a disk drive of a magnetic disk memory comprising a revolving disk pack module, shown in detail, whereas the remaining disk drive elements are illustrated only to an extent that is necessary for an understanding thereof.

Referring to FIG. 1, a sectional view is illustrated as taken through a magnetic disk memory 1 which shows the structure and the seating of a dynamically-balanced disk pack module 2 including a revolving disk pack 3. The disk pack module 2 revolves in a housing 4 that is composed of a carrying shell 40 and a housing cover 41. The disk pack module 2 is composed of a hub 5, a shaft 6 and a drive motor 7. Ball bearings 8 are provided for two-sided seating of the disk pack module 2, the inner rings 80 of the ball bearings 8 surrounding and engaging the shaft extensions 60 of the shaft 6 with a positive lock. Bearing bushings 82 or, respectively, 83 are fixed on outer rings or races 81 of the ball bearings 8 and these bearing bushings 82 or, respectively, 83 are built into the carrying shell 40 such that the ball bearings 8 are tensed free of play in the axial direction. The hub 5 is axially fixed on the revolving shaft 6 with an interference fit on the basis of a center web 50. A drive motor 7, constructed as an internal motor is also provided, its winding-free rotor 70 being composed of a permanent magnet and being fixed on the inner surface of a cylinder 51 of the hub 5 and a stator 71 carrying a stator winding 72.

As a consequence of the electromagnetic drive force of the motor 7, the hub 5 and, therefore the individual parts such as the data disks 30, spacer rings 31 between the data disks and an annular disk 32 lying against a flange 52, that are combined to form a disk pack module, and are slipped onto the hub against a flange 52 of the hub, are placed in rotational motion. In the assembled condition, the axial fixing of the parts occurs on the basis of the frictional connection between a tension plate 10 and the flange 52 via the data disk 30, the spacer rings 31 and the annular disk 32, given a bias force that derives from the starting torque of fastening elements 100 (see FIG. 2). Whereas the flange 52 itself directly forms a part of the hub 5, the tension plate 10 is connected to the hub by way of a tension ring 9 and represents the receptacle device 20 for the disk pack. The function of the tension ring 9, the flange 52, the annular disk 32 and the tension plate 10 shall be set forth in greater detail below.

Figure 2:
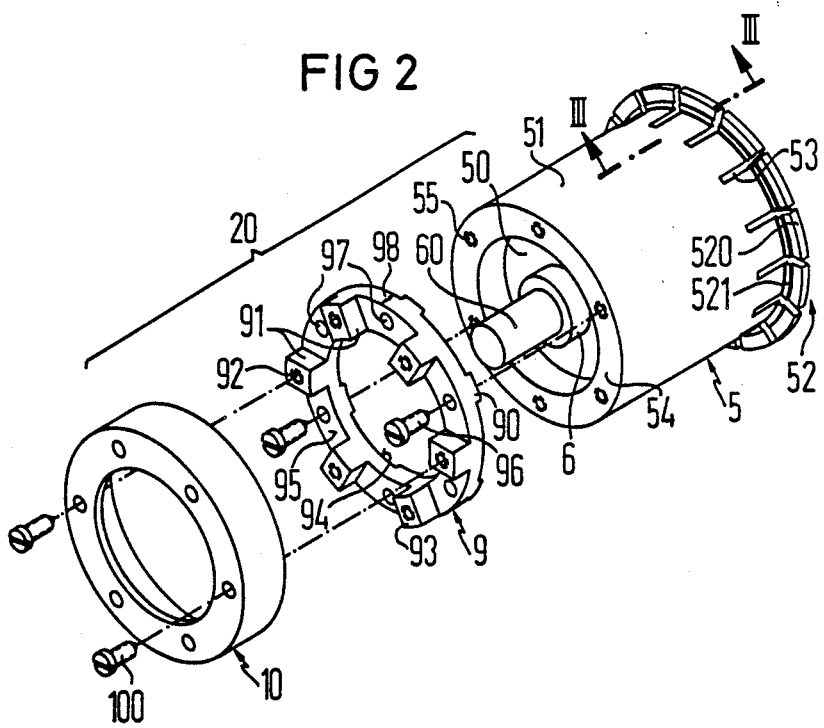
FIG. 2 is an exploded view of a hub of the disk pack module comprising a flange arranged at an angle relative to the hub surface, as well as a tension ring and a tension plate.

In a perspective, axonometric, exploded view, FIG. 2 shows the hub 5 with the flange 52 provided as a seating surface for the disk pack 3 and also shows the tension ring 9 and the tension plate 10. In the assembled condition, the tension plate 10 forms the two seating surfaces, together with the flange 52, between which the disk pack is tensed. As shown in FIG. 2, the flange 52 is composed of a plurality of flange segments 520 that radially extend from the cylinder 51 at a surface of the hub 5 and that terminate flush with this surface of the hub 5. They are respectively separated from one another by one of the axial slots 53 that extend somewhat axially into the cylinder 51 on the surface of the hub from which the introduction of the drive motor 7 occurs. The slots 53 still preferably end in front of the mounting location of the permanent magnet 70 (see FIG. 1) corresponding to the rotor of the drive motor.

The end face 54 at the opposite surface lying closer to the central web 50 comprises a plurality of radially-symmetrically arranged, threaded bores 55. A tension ring 9 of aluminum, comprising connecting elements 96 which are slotted screws in the exemplary embodiment, is flanged on concentrically relative to the shaft 6 at this surface. The outer diameter of the tension ring 9 corresponds to the outer diameter of the cylinder 51; the inner diameter of the tension ring 9 should be dimensioned such that the heads of the connecting elements 96 have an adequately large seating surface.

That side of the tension ring 9 facing towards the central web 50 forms its base area 94. Flat seating members 90 project therefrom in the axial direction and respectively include one of the bores 97 for the connecting elements 96. The seating surface of the seating members is kept as small as possible and is downwardly limited by the diameter of the bore. Analogously thereto, domes or projections 91 in the opposite direction are provided on the surface 95 of the tension ring. These are also radially symmetrical but are centrally offset relative to the seating members 90. The axial expanse of the domes is dimensioned such that the tension plate 10 that, like the data disk 30 and the spacer rings 31, is manufactured of aluminum and presses in a parallel plane on the outer surface 93 of the domes 91 and can be anchored in threaded bores 92 with the assistance of the fastening elements 100, the threaded bores 93 being provided in the domes 91. The tension plate 10 is constructed as a cup-shaped element and is inverted over the tension ring 9 in the assembled condition. It projects to such an extent in the axial direction that it presses against the facing data disk and therefore axially fixes the individual data disks 30, the spacer rings 31 and the annular disk 32 on the hub 5. An axial force $F_a$ acts on the individual flange elements 520 due to the starting torque of the fastening screws 100 and of the bias resulting therefrom. The flange segments are designed to be elastically deformable so that they bend differently dependent on the position of the point at which the force is applied.

Figure 3:
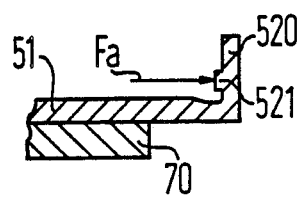
FIG. 3 is a sectional view taken through a segment of the flange along the sectional line III—III of FIG. 2 with an indicated force vector $F_a$.
Figure 4:
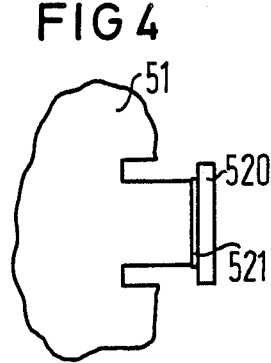
FIG. 4 is a plan view of a single flange element.
Figure 5:
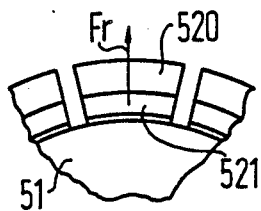
FIG. 5 is a front view of a single flange element having an indicated force vector $F_r$.

The desire, however, is to keep such deformations as slight as possible. As the sectional view of a segment, shown in FIG. 3, shows, each flange segment 520 therefore comprises a step 521 projecting from the inner surface facing towards the data disks. As the illustrations of a respective, individual flange segment in FIG. 4 or, respectively, FIG. 5 show, the step 521 extends over the entire radial width of the flange segment directly above the generated line of the cylinder 51 of the hub 5. It is therefore guaranteed that the axial force $F_a$ exerts only a slight bending moment on the flange segments and the elastic deformation is therefore limited.

As initially mentioned, the dissipative energy of the drive motor is transferred onto the hub surrounding the motor in the operating condition of the magnetic disk memory 1. Given divergent coefficients of thermal expansion of iron and aluminum, different material extensions thereby occur in the hub member and in the data disks, these taking effect both in the axial direction and in the radial direction.

The thermal expansion of the aluminum parts is thereby nearly twice as great as the expansion of the iron parts. Without counter measures, this leads to the initially-mentioned problem in the context of reading of the information stored on the individual data disks given established temperature swings, particularly because of the expansion in the radial direction. This is to be prevented in the present case by a neutralization of extension. The regions of the tension ring 9 between the seating members 90 and the domes 91, first of all, and, secondly, contact surface regions 333 (see FIG. 7) in the individual flange segments 520, are available for the radial neutralization of extension. These regions must be dimensioned or, respectively, designed such that an elastic deformation occurs that compensates the different material extensions.

It is assumed that the function of the tension ring 9 for radial neutralizaton of extension occurs in the following manner.

As a consequence of the different thermal expansions of the data disks 30, the spacer rings 31 and the tension plate 10, on the one hand, and of the hub, on the other hand, the tension ring 9 experiences different changes in diameter at the seating surfaces 90, the contact surfaces to the hub in the region of the seating members 90 and the tension plate 10 in the region of the seating surface 93 of the domes 91 given changes in temperature. This difference in diameter is compensated within the tension ring 9 in that essentially the regions twist between the seating surfaces 90 and the domes 91.

The elastic deformation of the tension ring 9 that has been set forth can occur when the radial force required at the respective surfaces 93 is less than or at most equal to the transmittable frictional force between the tension plate 10 and the facing data disk 30. According to Coulomb's law of friction, the frictional force $F_r$ is thereby proportional to the axial force $F_a$.

Figure 6:
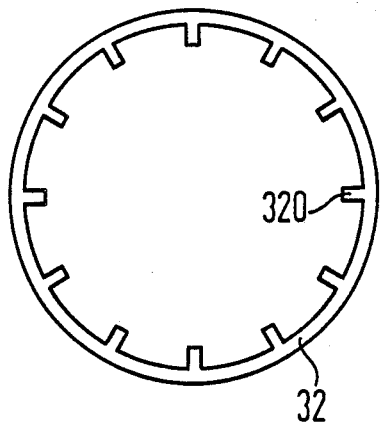
FIG. 6 is an end view of an annular disk that is introduced for increasing the surface pressure between the hub flange and the data disk.
Figure 7:
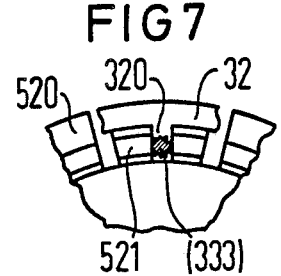
FIG. 7 is a fragmentary view of an annular disk, together with a single flange segment.

For neutralizing the radial extension at the flange side of the hub, it is advantageous to place an annular disk 32 between the first data disk and the respective flange segment for increasing the surface pressure. The annular disk 32 shown in FIG. 1 and in FIG. 6 comprises a plurality of projections 320 which are directly inwardly towards the axis of rotation and which are provided in a radially-symmetrical arrangement. The inner diameter formed by the projections 320 is thereby only slightly larger than the outer diameter of the cylinder 51, whereas the outer diameter of the annular disk is roughly the same as the radial expanse of the flange segments 520. The plurality of these projections 320 thereby corresponds to the plurality of flange segments 520, so that one projection of the annular disk 32 rests against the offset step 521 per flange segment, as shown in FIG. 7. The non-positive point seat in the contact area region 333 that is thereby achieved now guarantees that, given an extension of material occurring in the radial direction due to temperature fluctuations, the flange segment 520 elastically bends due to the frictional force $F_r$ building up according to Coulomb's law, such that this difference in extension is intercepted.

In order for this radial neutralization of extension to function unimpeded at least enough play in order to be able to intercept the difference of radial extensions of the hub 5 and the slipped-on elements in the full, allowed temperature range, must be radially present between the bore defining the inner diameter of the data disk 30 and the spacer rings 31, on the one hand, and the outer diameter of the hub 5 and the outer diameter of the tension ring, on the other hand.

As already initially mentioned, extensions of the material in the axial direction are also felt in addition to the occurring, radial extension of material as a consequence of temperature fluctuations in the operating condition of the magnetic disk memory. Due to the elastic clamping of the data disk 30 on the hub 5, these extensions are less critical than the radial extensions from the very outset. Finally, it should be pointed out that the vibrational stiffness of the entire disk pack module is not deteriorated by the design of the hub 5. This is also to be attributed thereto that all flange segments 520 above the first data disk and all domes 91 above the tension plate 10 are connected to one another and therefore contribute to an increase in the stiffness.

The exemplary embodiment that has been described above shows a structural design of a disk pack module wherein the seating surfaces for the data disks are constructed such that they can expand in accordance with the coefficient of thermal expansion given temperature changes within the magnetic disk memory, without the function of the magnetic disk memory being thereby negatively influenced. Further embodiments can be conceived within the scope of the present invention such as, for example, structural modifications of the hub or of the tension and deformation elements, as well as different selection of materials or the individual parts, without departing from the principle of the aforementioned and described embodiment.

Other embodiments of the invention may become apparent to those skilled in the art without departing from the spirit and scope of the invention. I therefore intend to include within the scope of the patent warranted hereon all such changes and modifications as may reasonably and properly be included within the scope of my contribution to the art.

I claim:

1. In a disk pack memory having a plurality of magnetic storage disks mounted on a rotatable hub having an axis of rotation, said magnetic storage disks spaced apart by spacers to form a stack, the improvement comprising:
   a radially-extending elastically-deformable flange disposed at an end of said hub;
   a tension plate disposed at an end of said hub opposite said radially-extending elastically-deformable flange for sandwiching said magnetic storage disks and said spacers between said tension plate and said radially-extending elastically-deformable flange; and
   a reversibly deformable tension ring disposed between said tension plate and said hub, said reversibly deformable tension ring fastened to said tension plate and said hub.

2. A disk pack memory as recited in claim 1, wherein said flange comprises a plurality of individual flange segments separated from one another by slots and arranged symmetrically about said hub.

3. A disk pack memory as recited in claim 1, further comprising an annular disk disposed between said flange and an adjacent magnetic storage disk for increasing surface pressure between said flange and said adjacent magentic storage disk.

4. A disk pack memory as recited in claim 1, wherein said tension ring comprises a first surface and a second surface each having surface projections extending in a direction parallel with said axis of rotation of said hub, said surface projections disposed on said first surface respectively offset from said surface projections disposed on said second surface, said surface projections on said first surface providing means for fastening said tension ring to said tension plate, said surface projections on said second surface providing means for fastening said tension ring to said hub.

5. A disk pack memory as recited in claim 4, wherein each of said surface projections has a threaded bore for engaging a respective threaded fastening element.

6. A disk pack memory as recited in claim 1, wherein said hub comprises a cylinder carrying said flange, said flange having a plurality of individual flange segments separated from one another by slots extending radially through said flange and further extending into said cylinder in a direction parallel to said axis of rotation.

7. A disk pack memory as recited in claim 6, wherein each of said flange segments further comprises a step projecting from each of said flange segments towards said magnetic storage disks and parallel to and spaced from said cylinder.

8. A disk pack memory as recited in claim 7, further comprising an annular disk positioned between said flange and an adjacent magnetic storage disk for increasing surface pressure between said flange and said adjacent magnetic storage disk, said annular disk having a plurality of radially extending projections arranged about said annular disk, each of said plurality of radially extending projections engaging a step on a respective flange segment of said plurality of individual flange segments.

9. In a disk pack memory having a plurality of magnetic storage disks mounted on a rotatable hub having an axis of rotation, said magnetic storage disks spaced apart by spacers to form a stack, the improvement comprising:
   a plurality of individual radially-extending elastically deformable flange segments separated from one another by slots extending into said hub in a direction parallel to said axis of rotation;
   a tension plate disposed at an end of said hub opposite said plurality of individual radially-extending elastically-deformable flange segments for sandwiching said magnetic storage disks and said spacers between said tension plate and said plurality of individual radially-extending elastically-deformable flange segments; and
   a reversibly deformable tension ring disposed between said tension plate and said hub, said reversibly deformable tension ring fastened to said tension plate and said hub.

10. A disk pack memory as recited in claim 9, wherein said tension ring comprises a first surface and a second surface each having surface projections extending in a direction parallel with said axis of rotation of said hub, said surface projections disposed on said first surface respectively offset from said surface projections disposed on said second surface, said surface projections on said first surface providing means for fastening said tension ring to said tension plate, said surface projections on said second surface providing means for fastening said tension ring to said hub.

11. In a disk pack memory having a plurality of magnetic storage disks mounted on a rotatable hub having an axis of rotation, said magnetic storage disks spaced apart by spacers to form a stack, the improvement comprising:
- a radially-extending elastically-deformable flange disposed at an end of said hub;
- a tension plate disposed at an end of said hub opposite said radially-extending elastically-deformable flange for sandwiching said magnetic storage disks and said spacers between said tension plate and said radially-extending elastically-deformable flange; and
- a reversibly deformable tension ring disposed between said tension plate and said hub, said reversibly deformable tension ring fastened to said tension plate and said hub and having a first surface and a second surface each having surface projections extending in a direction parallel with said axis of rotation of said hub, said surface projections disposed on said first surface respectively offset from said surface projections disposed on said second surface, said surface projections on said first surface providing means for fastening said tension ring to said tension plate, said surface projections on said second surface providing means for fastening said tension ring to said hub.

* * * * *